May 15, 1923. 1,455,490
P. E. HOLT
REMOVABLE GROUSER FOR TRACK LINKS
Filed May 20, 1918  2 Sheets-Sheet 1
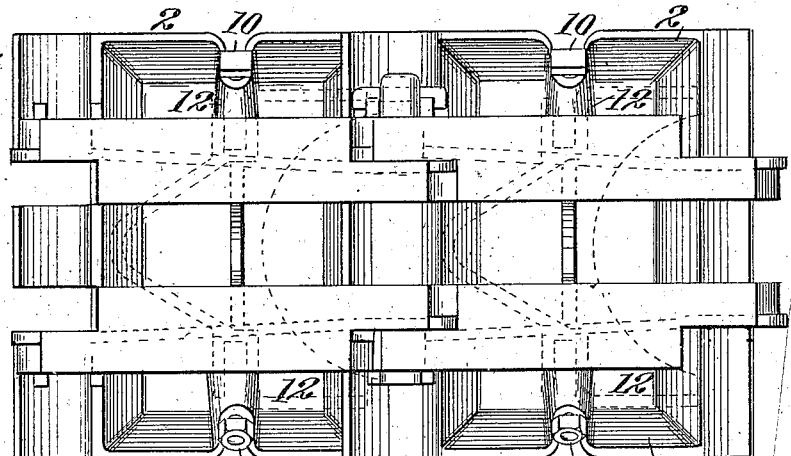
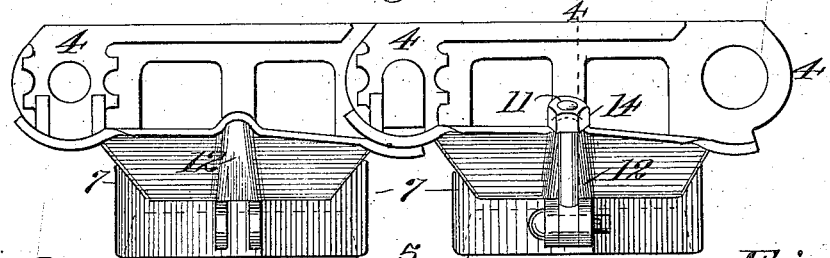
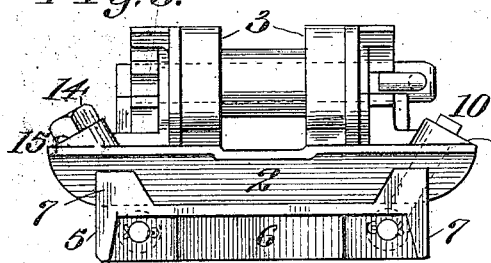
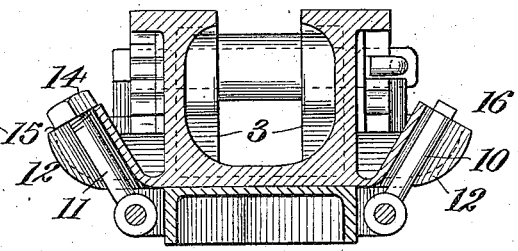
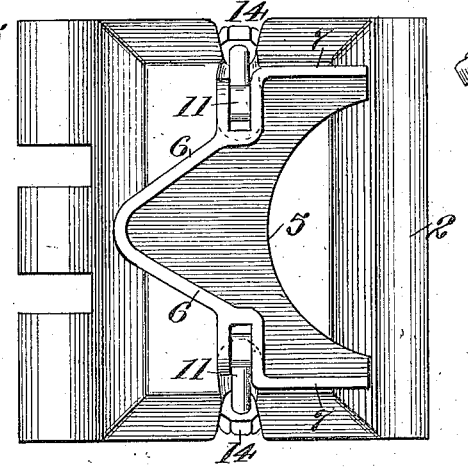
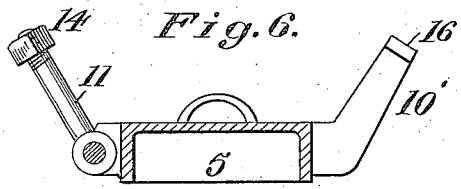
INVENTOR.
Pliny E. Holt
BY Strong & Townsend
ATTORNEYS May 15, 1923. 1,455,490
P. E. HOLT
REMOVABLE GROUSER FOR TRACK LINKS
Filed May 20, 1918  2 Sheets-Sheet 2
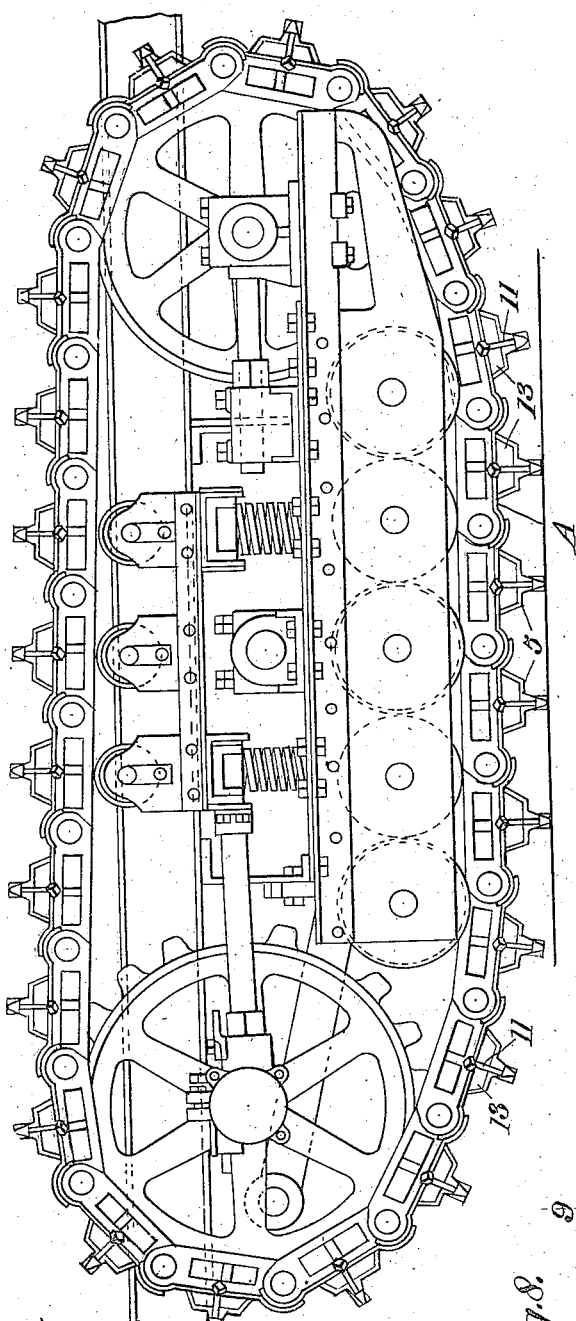
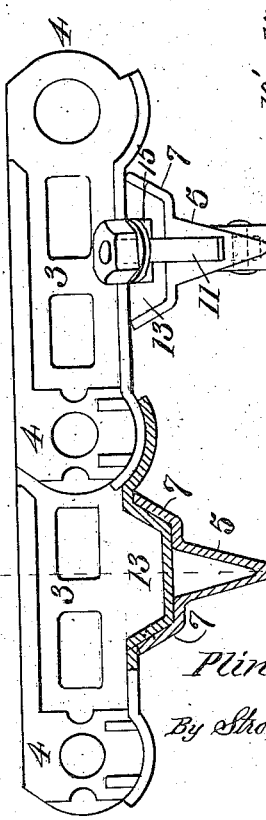
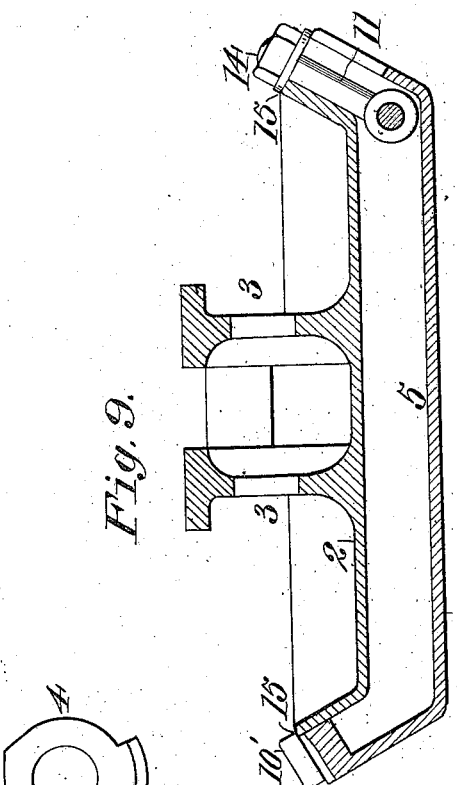
INVENTOR.
Pliny E. Holt
By Strong & Townsend
ATTORNEYS Patented May 15, 1923.

1,455,490

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

REMOVABLE GROUSER FOR TRACK LINKS.

Application filed May 20, 1918. Serial No. 235,644.

To all whom it may concern:

Be it known that I, PLINY E. HOLT, a citizen of the United States, residing at Stockton, in the county of San Joaquin and State of California, have invented new and useful Improvement in Removable Grousers for Track Links, of which the following is a specification.

This invention relates to self-laying tracks for chain track tractors and other vehicles, and pertains especially to the links entering into the composition of the chain tracks.

These chain tracks or tread belts are usually supplied with outwardly projecting ribs or grousers to provide traction. Such a construction is exemplified in co-pending application Serial Number 132,056, filed November 18th, 1916.

While it is permissible to use grousers of most any style or type in operating anywhere except upon highways and surfaced roads, it is not permissible in many localities and jurisdictions to drive a tractor over a finished highway, street or road shod with cleats or grousers, because they tear up or injure the roadway.

The present invention has been designed to meet these rules and requirements of the authorities so as to permit the use of flat treads on good roads and at the same time to permit the traction grousers or cleats to be attached quickly when they are needed.

Having reference to the accompanying drawings:

Fig. 1 is a plan view of two links coupled together.

Fig. 2 is a side view of same.

Fig. 3 is an end view of the link and grouser.

Fig. 4 is a cross section taken on the line 4—4 of Fig. 2.

Fig. 5 is a bottom view of the link and grouser.

Fig. 6 is a detail cross section of a modified grouser.

Fig. 7 is a side elevation of a tractor showing the track and grouser.

Fig. 8 is a detail side elevation, partly in section, of the preferred form of link and grouser.

Fig. 9 is a cross section taken on the line 9—9 of Fig. 8.

A is a chain track composed of conjoined links, each link comprising a tread plate 2 and the upstanding rail sections 3, having rail heads on which the truck rollers are adapted to run. The tread plate 2 and the rail sections are preferably cast integral.

The tread plates 2 are of suitable length and breadth to provide the desired tread surface. Usually they extend a substantial distance to each side of a pair of rail sections 3 and are practically coincident in length with the length of the sections 3; the adjacent ends of the tread plates being arcuate in form, as indicated at 4, and adapted to provide overlapping wipe joints to exclude sand, gravel and dirt from entering upwardly into interference with the tracks, and the truck rollers which run thereon.

The tread plates are smooth, at least they are not abruptly corrugated on their outer surfaces, so that if the track is used with the tread plates alone as the bearing surface the track belt can travel over a roadway without injury to the latter, no matter what the road surfacing may be. As a matter of fact, as above stated, it is one of the main objects of this invention to provide a traction engine of the chain track variety which can be operated on smooth roads without injury to the road surface and can work equally as well in soft or yielding ground with maximum traction.

This traction for soft places is provided by the grousers, indicated at 5. It is the construction of these grousers 5 and their means of attachment to the tread plates that constitute the essence of the present invention.

As here shown, these grousers 5 comprise castings or drop forgings with an outstanding V-shaped wedge adapted to bite into the ground; this outstanding wedge extending a substantial distance across the face of the tread plate.

In Figs. 7, 8 and 9 is shown the preferred form as applied to military use. In Figs. 1 to 6, inclusive, I show a modification in which the traction is provided with the angular gripping flange 6 with the extensions 7 adjacent to and parallel with the side edges of the plate. The point of the V faces to the rear, when on the ground, with the apex approximately centrally of the width of the plate. It will be manifest that the grouser casting or forging will generally fit the contour of the tread plate. The outstanding V-shaped flange 6 and its lateral and rear extensions 7 afford traction and insure against side slip.

The grousers of whatever form, whether straight, as in Figs. 7, 8 and 9 or angular, are quickly attachable and detachable by means of a T-bolt 10 and a clamping bolt 11 attached to opposite sides of the grouser and foldable upwardly and inwardly into inclined channels 12 formed by convoluting the side edges of the tread plate; these side edges being bent inwardly at an incline, as shown, thereby forming a strengthening flange. In Figs. 3 and 4 the T-bolt 10 is shown as hinged to the grouser and in Figs. 6 and 9 the T-bolt 10' is in the form of a rigid extension of the grouser, being cast or forged integrally therewith.

The contiguous faces of the grousers and tread plates are made conformable. In the military type, illustrated in Figs. 7, 8 and 9, it is preferable to position the grousers as near the point of articulation of the links as possible, in view of the heavy superposed load. Inasmuch as the straight, V-shaped grouser used in this case is comparatively narrow, it is desired to give as much support as possible and hence it is that its underside is concaved to fit the convexity 13 of the overlapping end of the complementary track shoe.

In operation, a grouser is attached by simply hooking a T-bolt 10 or 10' into a recess 12 provided on that side of the link, laying the grouser across the tread surface of the tread plate, pushing the hinge clamping bolt 11 into its recess 12, and then tightening up on the clamp nut 14; the top edge faces of the walls forming the slots or recesses 12 being straight and at right angles to the length of said slots to provide square seats, as shown at 15, for the head 16 of the T-bolt 10 and for the nut 14, so that when the nut is tightened there is no possibility of the parts being displaced by the T-head or nut slipping.

The tread plates all being symmetrical, that is, the slots 12 being identical on each side and the grousers being substantially symmetrical, they are interchangeable with right or left side tracks, and it would only be necessary to assemble the clamp bolt 11 with the grousers, so that the clamp bolt, with its adjusting nut, is always on the outside. As before stated, this construction allows the use of flat treads on good roads and permits the grousers to be attached quickly when they are needed. Furthermore, as the nuts 14 are always at the outer edge of the tracks and removed a substantial distance from the tread surface, it renders the securing means readily accessible from the inside of the tread even with the grouser upon the ground.

It is obvious that various changes may be made in the details of construction and in the form and proportions of the parts without in any wise departing from the spirit of the invention.

Having thus described my invention, what I claim and desire to secure by Letters Patent is—

1. In combination with a track-link having a permanent shoe formed with a comparatively smooth and even tread surface, with its inner and outer sides formed with upstanding portions, means for converting the smooth tread surface of the shoe into an irregular surface, comprising a detachable grouser to fit over the tread surface of the shoe, and means carried at opposite ends of the grouser to grip the upstanding portions of the shoe for retaining the grouser in place.

2. The combination with a track link having a flat tread surface, the opposite edges of the surface portion of the track link being inwardly turned and provided with slots, of a detachable grouser having securing members engageable in said slots.

3. In combination with a track-link having a permanent shoe formed with a comparatively smooth and even tread surface, of means to convert the smooth tread surface of the shoe into an irregular surface, comprising a detachable grouser to fit over the shoe, means on the grouser to engage the opposite sides of the shoe whereby to prevent fore and aft displacement, and means on the grouser to grip the inner and outer edges of the shoe for retaining the grouser in place.

4. A track link for endless chain track vehicles, comprising parallel side rails, tread plates cast integrally therewith and extending upwardly from the opposite sides thereof, upwardly and outwardly inclined recesses formed in said tread plates at the outer sides of the rails, and removable grousers with locking means to rest within the recesses and to thereby lock the shoes in position.

5. A detachable grouser comprising a tread member having a T-bolt at one side and a clamping bolt at the other side.

6. The combination of a tread plate and a grouser, said tread plate having slots in its opposite sides, and means engaging the grouser and the slots for detachably connecting the grouser to the tread plate.

7. In a chain track, the combination of conjoined track links having tread plates, a removable grouser to fit over each of the tread plates and fastening means at each end of the grouser to engage the adjacent edge of the tread plate, said fastening means comprising a gripper member at one end and a pivotally mounted clamping member at the other end of the grouser.

In testimony whereof I have hereunto set my hand in the presence of two subscribing witnesses.

PLINY E. HOLT.

Witnesses:
 JOHN H. HERRING,
 W. W. HEALEY.